(12) United States Patent
Sinaguinan

(10) Patent No.: US 10,035,516 B2
(45) Date of Patent: *Jul. 31, 2018

(54) SYSTEM AND METHOD FOR APPLYING VEHICLE SETTINGS IN A VEHICLE

(71) Applicant: Honda Motor Co., Ltd., Tokyo (JP)

(72) Inventor: Justin E. Sinaguinan, Los Angeles, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/468,251

(22) Filed: Mar. 24, 2017

(65) Prior Publication Data
US 2017/0197631 A1    Jul. 13, 2017

Related U.S. Application Data

(63) Continuation of application No. 14/859,405, filed on Sep. 21, 2015, now Pat. No. 9,643,619.

(51) Int. Cl.
*B60W 50/00* (2006.01)
*B60W 40/08* (2012.01)
*G06F 9/445* (2018.01)

(52) U.S. Cl.
CPC ........ *B60W 50/0098* (2013.01); *B60W 40/08* (2013.01); *G06F 9/44505* (2013.01); *B60W 2540/06* (2013.01); *B60W 2540/28* (2013.01); *B60W 2550/40* (2013.01); *B60W 2710/00* (2013.01)

(58) Field of Classification Search
CPC ............. B60W 50/0098; B60W 40/08; B60W 2540/28; B60W 2710/00; B60W 2720/00; B60W 2750/00; G06F 9/44505

USPC ......................................................... 701/36
See application file for complete search history.

(56) References Cited

U.S. PATENT DOCUMENTS

| 6,663,010 B2 | 12/2003 | Chene et al. |
| 7,050,795 B2 | 5/2006 | Wiegand et al. |
| 7,170,400 B2 | 1/2007 | Cowelchuk et al. |
| 8,594,861 B2 | 11/2013 | Rovik et al. |
| 8,706,349 B2 | 4/2014 | Rector et al. |
| 8,761,998 B2 | 6/2014 | Chen et al. |
| 8,825,222 B2 | 9/2014 | Namburu et al. |
| 2012/0095790 A1* | 4/2012 | Stefik ..................... G06Q 10/02 705/5 |
| 2012/0253552 A1* | 10/2012 | Skelton ................ B60K 28/063 701/2 |

(Continued)

*Primary Examiner* — Anne M Antonucci
*Assistant Examiner* — James E Stroud
(74) *Attorney, Agent, or Firm* — Rankin, Hill & Clark LLP

(57) ABSTRACT

A method and system for applying vehicle settings to a vehicle that include storing at least one user settings profile on a plurality of components associated with the vehicle based on a computing device that is used to create or update the at least one user settings profile. The system and method also include determining if the at least one user settings profile has been updated since a last ignition cycle of the vehicle. The system and method further include selecting the at least one user settings profile to be applied to control a vehicle system of the vehicle from at least one component of the plurality of components based on if the at least one user settings profile has been updated since the last ignition cycle of the vehicle and on a connection of at least: a first portable device and a second portable device to the vehicle.

20 Claims, 5 Drawing Sheets

(56) References Cited

U.S. PATENT DOCUMENTS

| | | |
|---|---|---|
| 2012/0303178 A1 | 11/2012 | Hendry et al. |
| 2013/0297099 A1 | 11/2013 | Rovik |
| 2013/0304349 A1* | 11/2013 | Davidson ............. G08G 1/0112 |
| | | 701/99 |
| 2014/0058586 A1* | 2/2014 | Kalhous .................. B60R 25/24 |
| | | 701/2 |
| 2014/0129113 A1* | 5/2014 | Van Wiemeersch .... F02D 28/00 |
| | | 701/102 |
| 2014/0129301 A1* | 5/2014 | Van Wiemeersch ....................... |
| | | G07F 17/0057 |
| | | 705/13 |
| 2015/0148018 A1* | 5/2015 | Rose .................. H04M 1/72577 |
| | | 455/418 |
| 2015/0217726 A1* | 8/2015 | Lee ........................ B60K 28/02 |
| | | 701/1 |
| 2015/0217780 A1* | 8/2015 | Chen .................... B60R 16/037 |
| | | 701/2 |
| 2016/0140649 A1* | 5/2016 | Kleve ................ G06Q 30/0645 |
| | | 705/307 |

\* cited by examiner

SYSTEM AND METHOD FOR APPLYING VEHICLE SETTINGS IN A VEHICLE

CROSS-REFERENCE TO RELATED APPLICATION

This application is a continuation of, and claims priority to, U.S. application Ser. No. 14/859,405, filed on Sep. 21, 2015, the entire application of which is incorporated herein by reference.

BACKGROUND

Many vehicles today include vehicle systems and features that can be adjusted based on user preferences associated with one or more drivers and/or passengers. The user preferences can be utilized to adjust various settings of the features of vehicle systems in order to provide a customized environment within the vehicle for the driver and/or passenger. In many instances, a vehicle is shared by multiple drivers that each have a different set of driver settings that need to be adjusted within the vehicle based on which driver is operating the vehicle. In some cases, the drivers modify the vehicle settings already implemented within the vehicle. Determining which set of driver settings to apply can be a complicated process especially when multiple drivers of the vehicle each utilize and modify driver settings to be applied to the same vehicle.

SUMMARY

According to one aspect, a computer-implemented method for applying vehicle settings to a vehicle. The computer-implemented method includes storing at least one user settings profile on a plurality of components associated with the vehicle based on a computing device that is used to create or update the at least one user settings profile. The plurality of components include a head unit of the vehicle, a telematics control unit of the vehicle, and a central user settings data repository. The computer-implemented method also includes determining if the at least one user settings profile has been updated since a last ignition cycle of the vehicle. The computer-implemented method further includes selecting the at least one user settings profile to be applied to control a vehicle system of the vehicle from at least one component of the plurality of components based on if the at least one user settings profile has been updated since the last ignition cycle of the vehicle and on a connection of at least: a first portable device and a second portable device to the vehicle.

According to a further aspect, a system for applying vehicle settings to a vehicle. The system includes a memory storing instructions when executed by a processor cause the processor to store at least one user settings profile on a plurality of components associated with the vehicle based on a computing device that is used to create or update the at least one user settings profile. The plurality of components include a head unit of the vehicle, a telematics control unit of the vehicle, and a central user settings data repository. The instructions also cause the processor to determine if the at least one user settings profile has been updated since a last ignition cycle of the vehicle. The instructions further cause the processor to select the at least one user settings profile to be applied to control a vehicle system of the vehicle from at least one component of the plurality of components based on if the at least one user settings profile has been updated since the last ignition cycle of the vehicle and on a connection of at least: a first portable device and a second portable device to the vehicle.

According to still another aspect, a non-transitory computer-readable storage medium is provided that stores instructions that, when executed by a computer, causes the computer to perform a method. The instructions include storing at least one user settings profile on a plurality of components associated with a vehicle based on a computing device that is used to create or update the at least one user settings profile. The plurality of components include a head unit of the vehicle, a telematics control unit of the vehicle, and a central user settings data repository. The instructions also include determining if the at least one user settings profile has been updated since a last ignition cycle of the vehicle. The instructions further include selecting the at least one user settings profile to be applied to control a vehicle system of the vehicle from at least one component of the plurality of components based on if the at least one user settings profile has been updated since the last ignition cycle of the vehicle and on a connection of at least: a first portable device and a second portable device to the vehicle.

DETAILED DESCRIPTION

Figure 1:
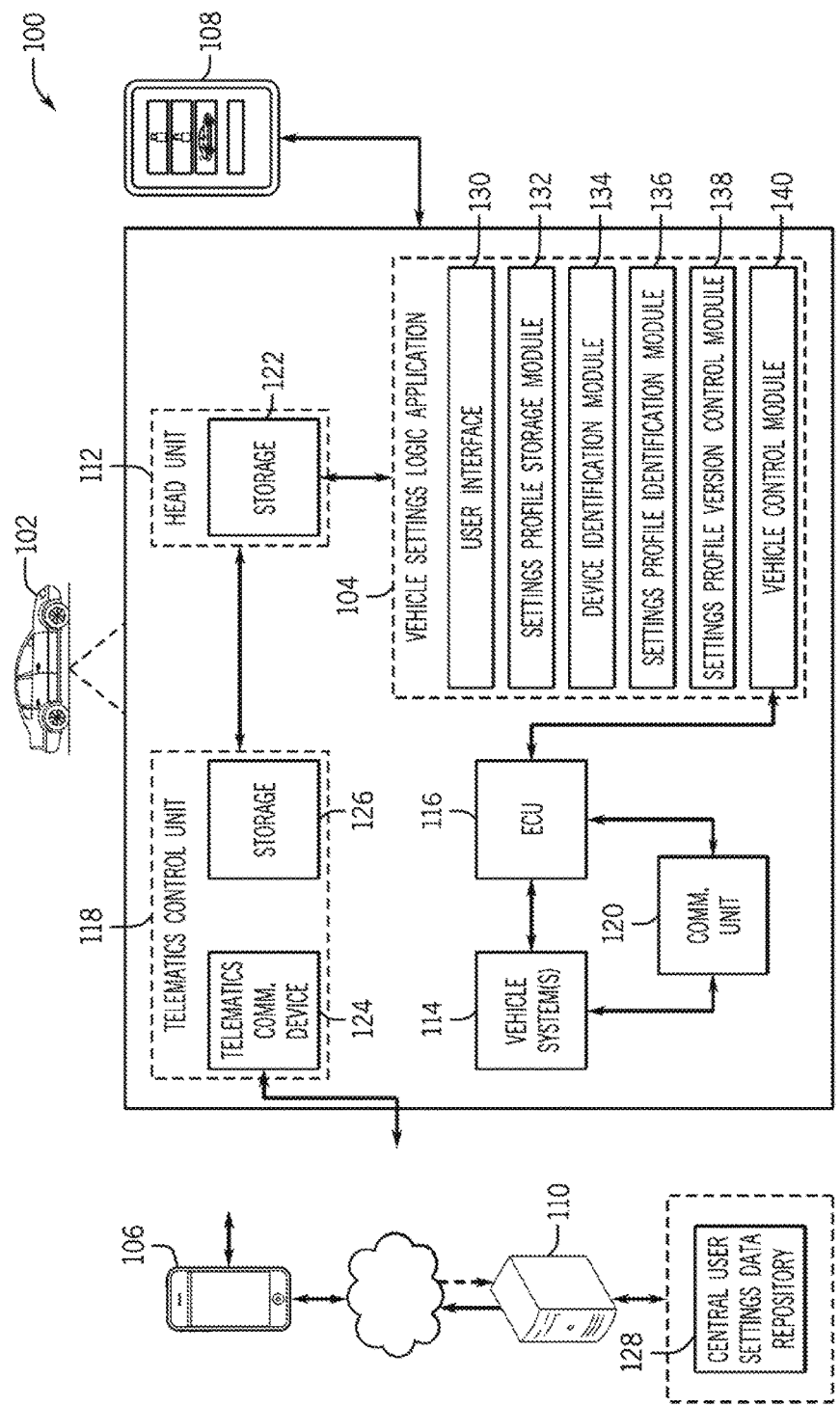
FIG. 1 is a schematic view of an exemplary operating environment of a vehicle settings decision logic system for applying vehicle settings in a vehicle according to an exemplary embodiment of the present disclosure.

The following includes definitions of selected terms employed herein. The definitions include various examples and/or forms of components that fall within the scope of a term and that can be used for implementation. The examples are not intended to be limiting.

A "bus,' as used herein, refers to an interconnected architecture that is operably connected to transfer data between computer components within a singular or multiple systems. The bus can be a memory bus, a memory controller, a peripheral bus, an external bus, a crossbar switch, and/or a local bus, among others. The bus can also be a vehicle bus that interconnects components inside a vehicle using protocols such as Controller Area network (CAN), Media Oriented System Transport (MOST), Local Interconnect Network (LIN), among others.

"Computer communication," as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

An "input device," as used herein can include devices for controlling different vehicle features which include various vehicle components, systems, and subsystems. The term "input device" includes, but it not limited to: push buttons, rotary knobs, and the like. The term "input device" additionally includes graphical input controls that take place within a user interface which can be displayed by various types of mechanisms such as software and hardware based controls, interfaces, or plug and play devices.

A "memory," as used herein can include volatile memory and/or nonvolatile memory. Non-volatile memory can include, for example, ROM (read only memory), PROM (programmable read only memory), EPROM (erasable PROM) and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

A "module," as used herein, includes, but is not limited to, hardware, firmware, software in execution on a machine, and/or combinations of each to perform a function(s) or an action(s), and/or to cause a function or action from another module, method, and/or system. A module can include a software controlled microprocessor, a discrete logic circuit, an analog circuit, a digital circuit, a programmed logic device, a memory device containing executing instructions, and so on.

An "operable connection," as used herein can include a connection by which entities are "operably connected", is one in which signals, physical communications, and/or logical communications can be sent and/or received. An operable connection can include a physical interface, a data interface and/or an electrical interface.

An "output device," as used herein can include devices that can derive from vehicle components, systems, subsystems, and electronic devices. The term "output devices" includes, but is not limited to: display devices, and other devices for outputting information and functions.

A "processor," as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "vehicle," as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, personal watercraft, and aircraft. In some cases, a motor vehicle includes one or more engines.

A "vehicle system," as used herein can include, but are not limited to, any automatic or manual systems that can be used to enhance the vehicle, driving and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, among others.

Referring now to the drawings, wherein the showings are for purposes of illustrating one or more exemplary embodiments and not for purposes of limiting the same, FIG. 1 is a schematic view of an exemplary operating environment of a vehicle settings decision logic system 100 for applying vehicle settings in a vehicle. In an exemplary embodiment, the vehicle settings decision logic system 100 can be utilized to determine one of a plurality of predetermined user settings that are digitally created in the form of one or more user settings profiles to be stored on and applied from one of a plurality of components in order to adjust programmable functions of one or more vehicle systems. The vehicle settings decision logic system 100 can identify one of a plurality of user settings profiles that are created by a user (e.g., driver of the vehicle) and that are associated to one or more portable devices in order to ensure that the appropriate set of user preferences are applied for the user utilizing the vehicle. The components of the system 100, as well as the components of other systems, hardware architectures, and software architectures discussed herein, can be combined, omitted or organized into different architecture for various embodiments. However, the exemplary embodiments discussed herein focus on the environment as illustrated in FIG. 1, with corresponding system components, and related methods.

As shown in FIG. 1, the vehicle settings decision logic system 100 provides an overview showing the communications and data transfers between a vehicle 102 that executes a vehicle settings logic application 104, a first portable device (a mobile computing device) 106, a second portable device (a smart key device) 108, and an external server infrastructure 110 that includes one or more external servers. In an exemplary embodiment, the vehicle settings logic application 104 provides a decision logic for applying one of a plurality of user settings profiles that include user customized settings that are utilized to adjust one or more programmable functions (e.g., settings) of one or more vehicle systems 114 according to one of the plurality of user settings profiles. In one embodiment, the user settings profiles are individual data files that contain programming code that can be interpreted by the vehicle settings logic application 104 to provide commands to adjust the programmable functions of the vehicle system(s) 114.

In an exemplary embodiment, each mobile computing device 106 and smart key device 108 of the system 100 includes a corresponding device identification (ID). As discussed in more detail below, the device ID can be a unique identifier that can be utilized by the vehicle settings logic application 104 to determine if one or more of the mobile computing devices 106 and/or the smart key devices 108 are connected to the vehicle 102. In one embodiment, the device ID can be received and evaluated at the time when a driver of the vehicle 102 enables a vehicle ignition switch (turns the vehicle ignition to an accessory battery powered or engine ON state) in order to determine if the mobile computing device 106 and/or the smart key device 108 are utilized by one or more users when using the vehicle 102. The vehicle settings logic application 104 can be utilized by a user to create or update (create/update) a user settings profile and further associate the created/updated user settings profile to his/her mobile computing device 106 and/or smart key device 108. Additionally the user settings logic application 104 provides customized settings that are applicable to the vehicle system(s) 114 when the driver enables the ignition of the vehicle 102 based on the receipt of the device ID(s) that are specifically associated to the applied user settings profile. For example, the vehicle settings logic application 104 can receive and utilize the device ID corresponding to a driver's mobile computing device 106 to determine if/when the driver is utilizing (carrying, using) the mobile computing device 106 when he/she drives the vehicle 102 in order to apply the driver's user settings profile based on the receipt of the device ID from the driver's mobile computing device 106.

The vehicle 102 of the remote vehicle settings control system 100 can include a head unit 112, the vehicle systems 114, an electronic control unit (ECU) 116, a telematics control unit (TCU) 118, and a communication unit 120. In one embodiment, the ECU 116 can include internal processing memory, an interface circuit, and bus lines for transferring data, sending commands, and communicating with the vehicle systems 114. Generally, the ECU 116 includes a processor and memory (not shown).

In one embodiment, the ECU 116 operably controls one or more vehicle systems 114 based on the application of the selected user settings profile by the vehicle settings logic application 104. The vehicle systems 114 can include (individual vehicle systems not shown), but are not limited to an audio system, climate control system, infotainment system, navigation system, telecommunications system, vehicle ergonomics system, vehicle safety system, etc.

In one embodiment, the communication unit 120 included within the vehicle 102 is capable of providing wired or wireless computer communications utilizing various protocols to send/receive electronic signals within the vehicle 102 and to external devices including the mobile computing device 106, the smart key device 108, that are directly connected (e.g., through a Bluetooth connection, radio frequency connection, proximity sensing connection, etc.) to the vehicle 102, when the vehicle ignition is enabled. Additionally, the communication unit 120 is operably connected for internal computer communication via a bus (e.g., a Controller Area Network (CAN) or a Local Interconnect Network (LIN) protocol bus) to facilitate data input and output between the components of the vehicle 102. For instance, the communication unit 120 can be utilized for sending data internally within the vehicle 102 between the ECU 116, the head unit 112, the TCU 118, and the vehicle systems 114.

In an exemplary embodiment, the head unit 112 of the vehicle 102 can be utilized to store hardware and software related to various vehicle systems 114. In one embodiment, the head unit 112 includes a separate storage 122 and a controller (not shown) that controls the processes of the head unit 112. The storage 122 of the head unit 112 can include various types of memory, as described above. In another embodiment, the head unit 112 is exclusively controlled by the ECU 116. The head unit 112 can be utilized to store and execute software corresponding to one or more vehicle systems 114 that are included as part of the head unit 112 and/or throughout the vehicle 102. The storage 122 can be utilized to store one or more operating systems, applications, application files, vehicle system and subsystem interface data, and the like that can be executed by the controller of the head unit 112 and/or the ECU 116. In one embodiment, the head unit 112 can also include a display unit (not shown) that can be utilized to display one or more user interfaces that are executed from one or more operating systems, applications, etc. that are stored on the storage 122 of the head unit 112. In an exemplary embodiment, the storage 122 of the head unit 112 can store one or more data files that can be utilized by one or more applications that are executed by the controller of the head unit 112 and/or the ECU 116 in order to adjust programmable features of the vehicle systems 114. For example, as discussed in more detail below, the storage 122 of the head unit 112 can store one or more user settings profiles (e.g., data files) that can be utilized by the vehicle settings logic application 104 executed on the head unit 112 in order to control the one or more vehicle systems 114.

In an exemplary embodiment, the TCU 118 of the vehicle 102 can be an external interface for mobile communication between the vehicle 102 and an external server infrastructure 110 through an internet cloud. In one embodiment, the TCU 118 can include a telematics communication device 124 that is capable of utilizing a GSM, GPRS, Wi-Fi, WiMax, or LTE wireless connection to send and receive one or more data files from the mobile computing device 106 and/or external server infrastructure 110 directly through the cloud. The TCU 118 can also include storage 126 that can include various types of memory (as described above with reference to the storage 122), and a microcontroller (not shown) that controls the processes of the TCU 118. In an exemplary embodiment, the storage 126 of the TCU 108 can store one or more data files that can be utilized by one or more applications that are executed by the head unit 112 and/or the ECU 116 in order to adjust programmable features of the vehicle systems 114. For example, as discussed in more detail below, the storage 126 of the TCU 118 can store one or more user settings profiles (e.g., data files) that can be utilized by the vehicle settings logic application 104 executed on the head unit 112 in order to control the one or more vehicle systems 114.

The mobile computing device 106 (first portable device) of the system 100 can include, but is not limited to, a handheld device, a mobile communication device, a smart phone, a laptop, a tablet, and an e-reader. In some embodiments, the mobile computing device 106 includes a display screen (not shown), a memory (not shown), and a communication device (not shown). In one embodiment, the memory of the first portable device 106 can be utilized to store the user settings profile (corresponding to the user) and the corresponding device identification (ID) that is utilized by the vehicle settings logic application 104 to determine when the mobile computing device 106 directly connects to the communication unit 120 of the vehicle 102.

In one embodiment, the device ID of each mobile computing device 106 can include a unique identification code that is created by the vehicle settings logic application 104 and is stored on the memory of the mobile computing device 106 in order to identify the mobile computing device 106. In another embodiment, the device ID can include a serial number corresponding to each mobile computing device 106 that is assigned to the mobile computing device 106 by a manufacturer of the mobile computing device 106 and is stored on the memory of the mobile computing device 106. Upon connecting to the vehicle 102, the mobile computing device 106 can send the device ID to the communication unit 120 to be identified by the vehicle settings logic application 104. As described in more detail below, the user can associate the device ID of his/her mobile computing device 106 to his/her user settings profile in order for the application 104 to apply customized settings on the functions of the vehicle system(s) 114. For example, when the driver of the vehicle 102 utilizes his/her mobile computing device 106 to connect to the vehicle 102 as he/she enables the vehicle 102, and the vehicle settings logic application 104 can control the functions of the vehicle systems 114 based on the user preference file that corresponds to the driver via the associated device ID of the mobile computing device 106.

The smart key device 108 (second portable device) of the system 100 can include, but is not limited to, an electronic key fob, a vehicle remote, a smart key, an electronic key chain, etc. that can be utilized to control access to the vehicle 102 (e.g., via smart entry door handles). The smart key device 108 can include memory (not shown) and a communication device (not shown). The memory of the smart key device 108 can include a device ID that is associated to the smart key device 108 that is utilized by the vehicle settings logic application 104.

In one embodiment, the device ID of each smart key device 108 can include a unique identification code that is created by the vehicle settings logic application 104 and is stored on the memory of the smart key device 108 in order to identify the smart key device 108. In another embodiment, the device ID can include a serial number corresponding to each smart key device 108 that is assigned to the smart key device 108 by a manufacturer of the vehicle 102 or the smart key device 108 and is stored on the memory of the smart key device 108. Upon connecting to the vehicle 102, the mobile computing device 106 can send the device ID to the communication unit 120 to be identified by the vehicle settings logic application 104. As described in more detail below, the user can associate the device ID of the smart key device 108 to his/her user settings profile in order for the application 104 to apply customized settings on the functions of the vehicle systems 114 when the smart key device 108 connects to the vehicle 102. For example, when the driver of the vehicle 102 utilizes his/her smart key device 108 to enable the vehicle 102, the vehicle settings logic application 104 can control the functions of the vehicle systems 114 based on the user preference file that corresponds to the driver via the associated device ID of the driver's smart key device 108.

In one embodiment, the external server infrastructure 110 can include a plurality of interconnected servers that support and maintain data that can be sent to the telematics communication device 124 of the TCU 118 and can be further utilized by one or more components of the vehicle 102. The external server infrastructure 110 can include but is not limited to web servers, data servers, database servers, domain controllers, backup servers, and the like. In an exemplary embodiment, the external server infrastructure 110 can include a central user settings data repository 128. As explained in more detail below, in one embodiment, the central user settings data repository 128 can be utilized to store one or more user settings profiles that correspond to one or more users that are applied by the vehicle settings logic application 104.

In an exemplary embodiment shown in FIG. 1, the vehicle settings logic application 104 can be executed on the head unit 112 of the vehicle 102 and can be accessed by the driver via the display unit of the head unit 112 and/or the mobile computing device 106. In one embodiment, the vehicle settings logic application 104 can be a remote software application that is installed directly onto the mobile computing device 106 that interfaces with a host software application that is executed on the head unit 112 of the vehicle 102. In another embodiment, the vehicle settings logic application 104 and/or one or more components of the vehicle settings logic application 104 can be installed and executed externally from the head unit 112 and/or the mobile computing device 106 on a personal computing device (not shown) (e.g., personal computer, laptop, etc.). In some embodiments, the vehicle settings logic application 104 can include a web based application that can be executed on the external server infrastructure 110 and can be accessed by the vehicle 102, the mobile computing device 106, and/or the personal computing device through a web browser interface. In other embodiments, the vehicle settings logic application 104 can include a cloud based application that is executed on the external server infrastructure 110 and that is accessed through a viewer application that is installed on the storage 122 of the head unit 112 and/or the memory of the mobile computing device 106.

In an exemplary embodiment, the vehicle settings logic application 104 includes various modules, discussed in detail below. Each user (e.g., driver of the vehicle 102) can utilize the vehicle settings logic application 104 to create an individual user settings profile. In addition to creating a user settings profile, the vehicle settings logic application 104 can be utilized by each user to update a pre-existing (already created and utilized) user settings profile within the vehicle 102 in order to modify the user's customized settings already associated to the programmable features of the vehicle system(s) 114.

In an exemplary embodiment, the user's mobile computing device 106 and/or the user's smart key device 108 are connected to the vehicle 102. The vehicle settings logic application 104 can identify and apply the user settings profile according to the user's preferences in order adjust programmable features of the vehicle system(s) 114. For example, the vehicle settings logic application 104 can apply a driver's user settings profile in order to adjust settings that include audio system options, navigation system options, seat positioning options, mirror positioning options, lighting options, door lock options, audio alerts, visual alerts, etc., based on the user's preferences. Therefore, if a user associates his/her user settings profile to his/her mobile computing device 106 and/or smart entry device 108, when the user enters the vehicle 102 and the mobile computing device 106 and/or smart entry device 108 connects to the vehicle 102, the user settings profile that is associated to the mobile computing device 106 and/or smart entry device 108 will be applied in order to control the programmable features of the vehicle system(s) 114 according to the user's preferences.

In one embodiment, the vehicle settings logic application 104 includes a user interface 130 that can be utilized by each user to create and/or update his/her user settings profile. In addition, the user interface 130 can be utilized by each user to associate his/her user settings profile to one or both of the user's mobile computing device 106 and/or the smart key device 108. In one embodiment, the user interface 130 includes a user settings interface that provides the user with the ability to customize the programmable features of one or more of the vehicle systems 114 and store those customized settings into a new (by creating a user settings profile) or preexisting (by updating a user settings profile) user settings profile.

In one embodiment, the user interface 130 is presented on the display screen of the head unit 112 in order for the user to create/update his/her user settings profile directly from the vehicle 102. As discussed, the vehicle settings logic application 104 and the user interface 130 can also be accessed and displayed on the mobile computing device 106. Upon creation of the user settings profile, the user can utilize the user interface 130 on (the display unit of) the head unit 112, (the display unit of) the personal computing device or the mobile computing device 106 to associate the user settings profile to the mobile computing device 106 and/or the smart key device 108 in order for the user settings profile to be executed when the user enters the vehicle 102 with one of the corresponding devices 106, 108.

As an illustrative example, 'Driver A' can create a user settings profile on her mobile computing device 106 and can associate the newly created user settings profile to the device IDs of her mobile computing device 106 and her smart key device 108 (e.g., a first key fob of the vehicle 102) to be utilized when 'Driver A's' mobile computing device 106 and/or the smart key device 108 connects to the vehicle 102 (when she enters the vehicle 102 with the respective devices 106, 108). Similarly, 'Driver B' can create a user settings profile on the head unit 112 and can associate the newly created user settings profile to the device ID of his smart key device 108 (e.g., a second key fob of the vehicle 102) to be utilized when 'Driver B's' smart key device 108 connects to the vehicle 102 (when he enters the vehicle 102 with his smart key device 108).

Referring again to FIG. 1, in an exemplary embodiment, a settings profile storage module 132 of the vehicle settings logic application 104 is utilized to store the newly created/update user settings profiles that were created/updated by a driver on the user interface 130 at one or more components of the system 100. As will be discussed below, in an exemplary embodiment, the settings profile storage module 132 determines a location to store the driver's user settings profile based on the user's utilization of the mobile computing device 106 or the head unit 112 of the vehicle 116 to create/update the user settings profile.

Figure 2:
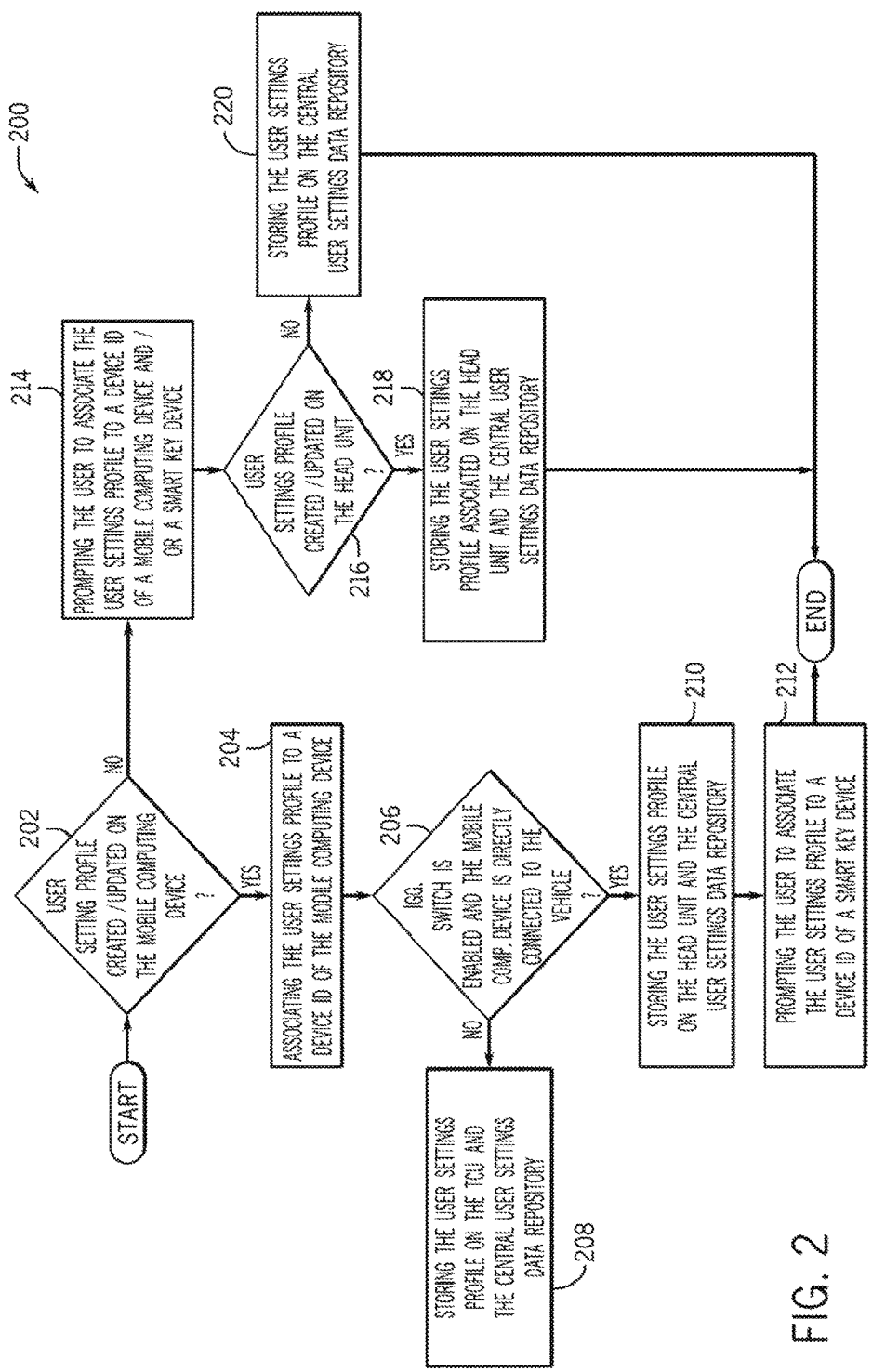
FIG. 2 is a process flow diagram of a method to store the created/updated user settings profile at one or more components of the system, according to an exemplary embodiment of the present disclosure.

Referring now to FIG. 2, a process flow diagram of a method 200 to store the created/updated user settings profile at one or more components of the system 100 is illustrated. FIG. 2 will be described with reference to the components of FIG. 1, though it is to be appreciated that the method of FIG. 2 can be used with other systems and/or components. In an exemplary embodiment, the method 200 is executed by the settings profile storage module 132 of the vehicle settings logic application 104. At block 202, the method includes determining if the user settings profile was created or updated (by the user) on the mobile computing device 106 (via the user interface 130). In one embodiment, the settings profile storage module 132 classifies the created/updated user settings profile as being created by the user through the mobile computing device 106, the head unit 112 of the vehicle 102, or the personal computing device. At block 204, if it is determined that the user settings profile was created/updated on the mobile computing device 106 (at block 202), the method includes associating the user settings profile to a device ID of the mobile computing device 106 that is used to create/update the user settings profile. For example, when the user utilizes the user interface 130 to create/update his/her user settings profile through the his/her mobile computing device 106, the user settings profile is automatically associated to the device ID of the user's mobile computing device 106.

The method proceeds to block 206, where the method includes determining if the ignition switch of the vehicle 102 is enabled and the mobile computing device 106 is directly connected to the vehicle 102. In one embodiment, the settings profile storage module 132 can utilize the communication device of the mobile computing device 106 to send a ping signal to the communication unit 120 in order determine if the vehicle ignition is in an accessory battery powered state or an engine ON state and that the mobile computing device 106 is in range to directly connect to the communication unit 120 of the vehicle 102. Specifically, if the vehicle ignition is enabled, (i.e., the vehicle 102 is receiving power) and the communication unit 120 received the ping signal (i.e., the mobile computing device 106 was located within a range of the vehicle 102 that a direct connection could occur), the communication unit 120 can receive the ping signal and can transmit a return signal to the communication device of the mobile computing unit 106. Upon receipt of the return signal, the settings profile storage module 132 determines that the ignition switch is enabled and that the mobile computing device 106 can directly connect to the vehicle 102. In other words, when the vehicle ignition switch is enabled, the communication unit 120 of the vehicle 102 is capable of directly connecting and communicating (e.g., via a Bluetooth connection) with the communication device of the mobile computing device 106, in order to directly transmit the user settings profile to the head unit 112 of the vehicle 102 and apply the user settings profile to the vehicle 102. Otherwise, when the ignition switch of the vehicle 102 is disabled, the vehicle 102 does not receive any power, and/or the mobile computing device 106 is not within a range to directly connect to the vehicle 102, the mobile communication device 106 cannot directly transmit the user settings profile to the head unit 112 of the vehicle 102.

If it is determined that the ignition switch of the vehicle 102 is not enabled and the mobile computing device 106 cannot directly connect to the vehicle 102 (at block 206), at block 208, the method includes storing the user settings profile on the TCU 118 and the central user settings data repository 128. In one embodiment, upon the settings profile storage module 132 determining that the mobile computing device 106 cannot directly connect to the vehicle 102, the settings profile storage module 132 can utilize the communication device of the mobile computing device 106 to send the user settings profile to the TCU 118 and the central user settings data repository 128 via the external server infrastructure 110. In one embodiment, the mobile computing device 106 can send the user settings profile via the wireless connection (e.g., Wi-Fi, 4G, LTE, etc.) to the external server infrastructure 110 on the cloud to be stored on the central user settings data repository 128. In one example, the user settings profile storage module 132 can utilize the telematics communication device 124 of the TCU 118 to obtain (via the wireless connection) the user settings profile from the central settings data repository 128 of the external server infrastructure 110 on the cloud to store the user settings profile on the storage 124 of the TCU 118. In another example, the user settings profile storage module 132 can utilize the telematics communication device 124 of the TCU 118 to directly communicate with the communication device of the mobile computing device 106 (via the wireless connection) to obtain the user settings profile from the mobile computing device 106 to be stored on the storage 124 of the TCU 118.

In another embodiment, if the settings profile storage module 132 stores the user settings profile on the TCU 118 (at block 208), the settings profile storage module 132 transfers a copy of the user's created/updated user settings profile to the storage 122 of head unit 112 from the storage 124 of the TCU 118. As will be described in more detail below, the created/updated user settings profile stored on the head unit 112 can be applied to the vehicle 102 by the vehicle settings logic application 104, when the device ID of the smart key device 108 is received by the device identification module 134 and the device ID of the mobile computing device 106 is not received by the device identification module 134 (i.e., the smart key device 108 is connected to the vehicle 102 and the mobile computing device 106 is not connected to the vehicle 102 when the ignition of the vehicle 102 is enabled).

If it is determined that the ignition switch of the vehicle 102 is enabled and the mobile communication device can directly connect to the vehicle 102 (at block 206), at block 210, the method includes storing the user settings profile on the head unit 112 and the central user settings data repository 128. Specifically, upon determining that the mobile computing device 106 can directly connect to the communication unit 120 of the vehicle 102, the settings profile storage module 132 (created on and associated to the mobile computing device 106) stores the user preference settings file associated to the mobile computing device 106 directly to the storage 122 of the head unit 112 of the vehicle 102. For example, if a driver utilizes his/her mobile computing device 106 to update his/her user settings profile, the settings profile storage module 132 stores the updated user preference file on the head unit 112 to be further evaluated as discussed in more detail below. In one embodiment, the user settings profile can also be sent via the wireless connection (e.g., Wi-Fi, 4G, LTE, etc.) from the communication device of the mobile computing device 106 to the external server infrastructure 110 on the cloud to be stored on the central user settings data repository 128. This embodiment ensures that the user settings profile associated with the user that is stored on the central user settings data repository 128 is the most recently updated copy of the user settings profile. In another embodiment, the user settings profile is additionally stored on the memory of the mobile computing device 106.

At block 212, the method includes prompting the user to associate a user settings profile to a device ID of a smart key device 108. Specifically, the settings profile storage module 132 can utilize the user interface 130 on the (display of the) mobile computing device 106 to prompt the user to associate (the device ID of) his/her smart key device 108 of the vehicle 102 to the user settings profile that is created/updated by the user on the mobile computing device 106. In one embodiment, the user interface 130 can communicate with the communication unit 120 in order to provide the user a list of a plurality of smart key devices 108 that were previously paired to the vehicle 102 (by the vehicle manufacturer, dealer, etc.)

Referring again to block 202 of FIG. 2, if it is determined that the user settings profile is not created/updated on the mobile computing device 106, at block 214, the method includes prompting the user to associate a user settings profile to a device ID of a mobile computing device 106 and/or a smart key device 108. In an exemplary embodiment, upon the user creating his/her user settings profile on the head unit 112 (e.g., the display unit of the head unit 112), the settings profile storage module 132 utilizes the user interface 130 on the head unit 112 to prompt the user to associate/re-associate (the device ID of) the user's mobile computing device 106 and/or smart key device 108 to the user settings profile that is created/updated by the user. In one embodiment, the user interface 130 can present a list of mobile computing devices 106 with corresponding device IDs that have been connected to the communication unit 120 of the vehicle 102 in the past (e.g., via a Bluetooth connection). The user interface 130 can additionally present a list of smart key devices 108 that were previously paired to the vehicle 102 (by the vehicle manufacturer, dealer, etc.) In another embodiment, the user interface 130 can present a list of one or more connected (via a direct connection to the vehicle 102) mobile computing devices 106 and/or smart key devices 108 that can each be selected by the user to associate to his/her user settings profile. For example, if the communication unit 120 connects to a mobile computing device 106 via a Bluetooth connection and a smart key device 108 via a radio frequency connection, the user interface 130 can present both devices 106, 108 on the list in order for the user to associate one or both of them to his/her user settings profile.

At block 216, the method includes determining if the user settings profile was created/updated on the head unit 112. In one embodiment, as discussed, the settings profile storage module 132 classifies the created/updated user settings profile as being created by the user through the mobile computing device 106, the head unit 112 of the vehicle 102, or the personal computing device. If it is determined that the user settings profile was created on the head unit 112 (at block 216), at block 218, the method includes storing the user settings profile on the head unit 112 and the central user settings data repository. In one embodiment, when the settings profile storage module 132 determines that the user settings profile is classified as being created by the driver on the user interface 130 on head unit 112 (e.g., the display unit of the head unit 112, the settings profile storage module 132 stores the user settings profile created/updated by the user on the head unit 112 directly on the storage 122 of the head unit 112). For example, if a driver utilizes the display unit of the head unit 112 to update his/her user settings profile and associates his/her user settings profile to the device ID of the mobile computing device 106 and the device ID of a smart key device 108, the vehicle profile storage module 120 stores the user preference file directly on the storage 122 of the head unit 112 to be further evaluated when the mobile computing device 106 and/or the smart key device 108 associated to the user settings profile are directly connected to the vehicle 102. Therefore, the settings profile storage module 132 ensures that the user settings profile is stored at one or more specific locations based on utilization of the mobile computing device 106 or the head unit 112 to create/update the user settings profile. The user settings profile can also be sent via the wireless connection (e.g., Wi-Fi, 4G, LTE, etc.) from the communication device of the mobile computing device 106 when it is connected to the vehicle 102. Specifically, the mobile communication device 106 can be utilized by the vehicle 102 to connect to the external server infrastructure 110 on the cloud in order to store the user settings profile on the central user settings data repository 128. In an alternate embodiment, the settings profile storage module 132 can also utilize the telematics communication device 124 to communicate with the external server infrastructure 110 through the cloud in order to access the user settings profile transferred directly from the mobile computing device 106 and stored on the central user settings data repository 128 to be downloaded to the head unit 112.

If it is determined that the user settings profile was not created on the head unit 112 (at block 216), at block 220, the method includes storing the user settings profile on the central user settings data repository 128. In one embodiment, when the settings profile storage module 132 determines that the user settings profile was not created/updated by the driver on the head unit 112 (at block 220), the settings profile storage module 132 determines that the user settings profile was created by the user on the personal computing device. When the user settings profile is created/updated on the personal computing device, the user settings profile is stored directly on the central user settings data repository 128 of the external server infrastructure 110 from the personal computing device.

Referring back to FIG. 1, as discussed above, upon the creation or update of the user settings profile on the mobile computing device 106, the head unit 112, and/or the personal computing device by the user, a copy of the user settings profile is sent to the external server infrastructure 110 in order to be stored on the central user settings data repository 128. In other words, the vehicle settings logic application 104 ensures that the central user settings data repository 128 always stores the latest updated version of the user settings profile created on the mobile computing device 106, the head unit 112, or the personal computing device. Also as discussed below, with respect to FIG. 4 (block 426), the system 100 also ensures that any user settings profile that is applied to adjust the settings of one or more vehicle systems 114 is saved to the central user setting data repository 128 to ensure that the central user settings data repository 128 stores the most recently utilized version of the user settings profile.

In one or more embodiments, when the user settings profile is created/updated on the personal computing device and the latest copy of the user settings profile is sent and stored on the central user settings data repository 128, upon the connection of the mobile device 106 to the vehicle 102, the communication device of the mobile device 106 can connect to the external server infrastructure 110 on the cloud via the wireless connection in order to download the latest updated version of the user settings profile to be stored on the mobile device 106 and on the storage 126 of the TCU 118. In addition, the latest updated version of the user settings profile can be transferred to the head unit 112 to be stored on the storage 122. This functionality ensures that there is synchronization with regards to the version of the user settings profile between the mobile computing device 106, the TCU 118, the head unit 112, and the central user settings data repository 128.

In one embodiment, if the user creates/updates his/her user settings profile on the head unit 112 (at block 216), the user settings profile can be sent to the TCU 118 to be stored on the storage 126. Additionally, the telematics communication device 124 of the TCU 118 or the communication device of mobile computing device 106 that is connected to the vehicle 102 can be utilized to connect to external server infrastructure 110 on the cloud via the wireless connection in order to store a copy of the user settings profile created/updated on the head unit 112 to the central user settings data repository 128. In one or more embodiments, when the user settings profile is created/updated on the head unit 112 and the latest copy of the user settings profile is sent and stored on the central user settings data repository 128, the communication device of the mobile computing device 106 connects to the external server infrastructure 110 on the cloud via the wireless connection in order to download the latest updated copy of the user settings profile. This functionality also ensures that there is synchronization with regards to the version of the user settings profile between the mobile computing device 106, the TCU 118, the head unit 112, and the central user settings data repository 128.

In an exemplary embodiment, the vehicle settings logic application 104 also includes a plurality of modules utilized to apply the user settings profile that is stored by the settings profile storage module 132 as discussed above. The vehicle settings logic application 104 includes a device identification module 134 that is utilized to determine if one or more mobile computing devices 106 and/or smart key devices 108 are directly connected to the vehicle 102. For example, when a driver enters the vehicle 102 with a mobile computing device 106 and/or the smart key device 108, upon the connection from the mobile computing device 106 and/or the smart key device 108 to the vehicle 102, the device identification module 134 receives the device ID from the mobile computing device 106 and/or the smart key device 108.

In one embodiment, the device identification module 134 communicates with the communication unit 120 in order to receive one or more device IDs (sent) from the connected mobile computing device 106 and/or the connected smart key device 108. More specifically, when the driver of the vehicle enables the vehicle ignition (using a smart key device 108, the mobile computing device 106 and/or a push button), the ECU 116 can send an electronic signal to the device identification module 134. Upon receipt of the electronic signal from the ECU 116 that indicates the vehicle ignition switch is enabled, the device identification module 134 can utilize the communication unit 120 of the vehicle 102 to determine if the mobile computing device 106 and/or the smart key device 108 is connected to the vehicle 102 by receiving one or more device IDs of any mobile computing device(s) 106 and/or smart key device(s) 108 connected to the communication unit 120 of the vehicle 102. For example, if the driver's mobile computing device 106 is connected to the communication unit 120 of the vehicle 102 (e.g., via a Bluetooth connection) when the vehicle ignition switch is enabled, the communication unit 120 supplies the device ID of the driver's mobile communication device 106 to the device identification module 134.

Similarly, if the driver's smart key device 108 is connected to the communication unit 120 of the vehicle 102 (e.g., via a radio frequency connection) when the vehicle ignition switch is enabled, the communication unit 120 supplies the device ID of the driver's smart key device 108 to the device identification module 134. In an exemplary embodiment, upon receipt of the device ID of the connected mobile computing device 106 and/or the connected smart key device 108, the device identification module 134 supplies the one or more device IDs to a settings profile identification module 136 of the vehicle settings logic application 104.

In the exemplary embodiment shown in FIG. 1, the settings profile identification module 136 can identify a user settings profile that is associated to the device ID of the connected mobile computing device 106 and/or the connected smart key device 108. The user settings profile can be stored on the mobile computing device 106, the TCU 118, the head unit 112, and/or the central user settings data repository 128 as determined by the device identification module 134 (per the method 200 of FIG. 2). In some embodiments, once the device identification module 134 utilizes the communication unit 120 of the vehicle 102 to determine the device ID(s) of the mobile computing device(s) 106 and/or the smart key device(s) 108 connected to the vehicle 102, the settings profile identification module 136 identifies the copy of the user settings profile that is associated to the device ID of the mobile computing device 106 and/or the smart key device 108. Specifically, the settings profile identification module 136 identifies a copy of the user settings profile stored at one or more locations (e.g., mobile computing device 106, TCU 118, head unit 112, central user settings data repository 128) in order to further evaluate the identified user settings profile to determine which version of the user settings profile to apply, as discussed in more detail below. For example, when the user created his/her user settings profile, if the settings profile storage module 132 stored the driver's user settings profile on the mobile computing device 106 (at step 210 of FIG. 2) and on the head unit 112 (at step 220 of FIG. 2), the settings profile identification module 136 identifies which copy of the driver's user settings profile to further evaluate.

Figure 3:
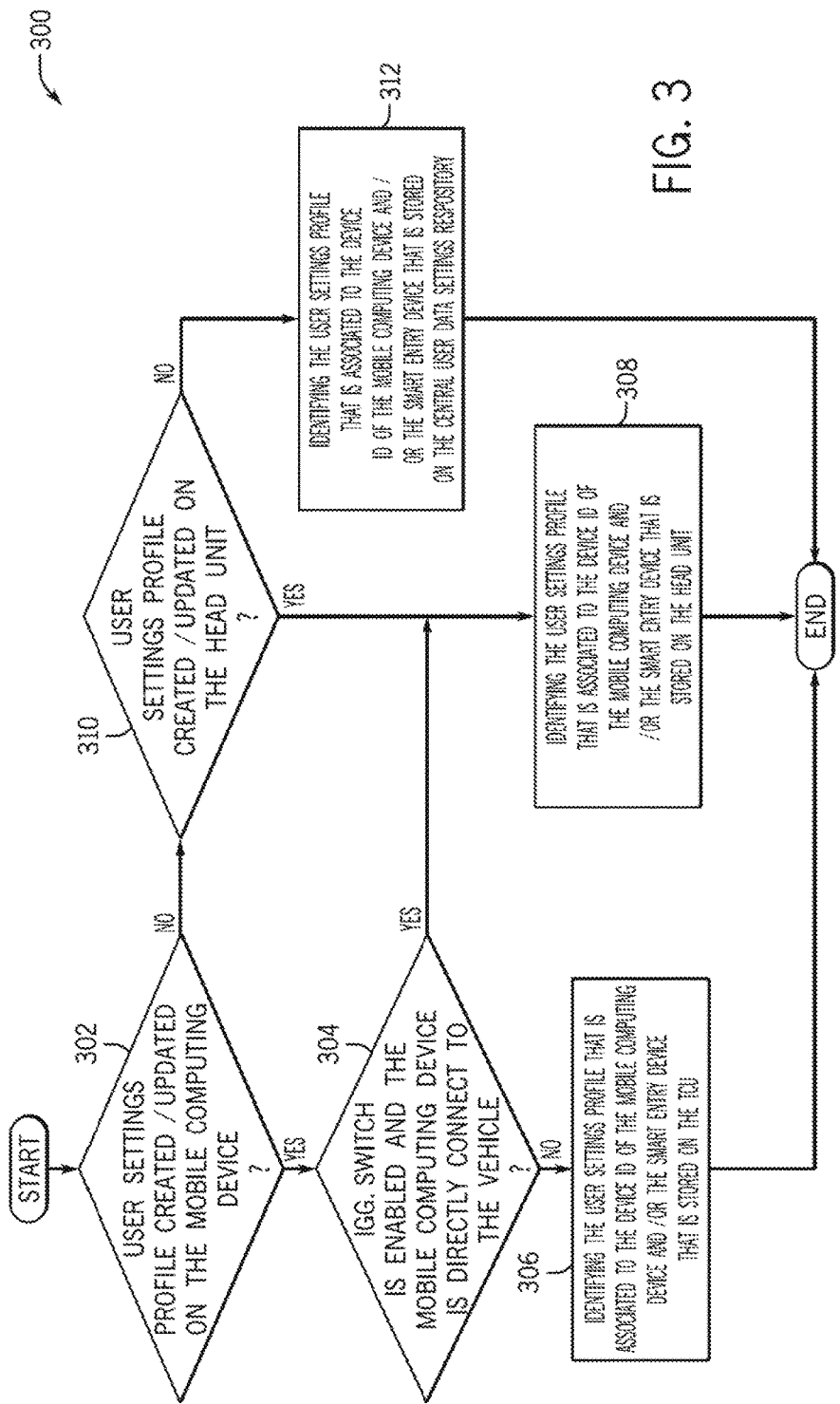
FIG. 3 is a process flow diagram of a method for identifying a user settings profile that is associated to a device ID that is stored at one or more components of the system, according to an exemplary embodiment of the present disclosure.

Referring now to FIG. 3, a process flow diagram of a method 300 for identifying a user settings profile that is associated to a device ID that is stored at one or more components of the system 100. FIG. 3 will be described with reference to the components of FIG. 1, though it is to be appreciated that the method of FIG. 3 can be used with other systems and/or components. In an exemplary embodiment, the method 300 is executed by the settings profile identification module 136 of the vehicle settings logic application 104.

At block 302, the method includes determining if the user settings profile was created/updated on the mobile computing device 106. In one embodiment, the settings profile identification module 136 can communicate with the settings profile storage module 132 to determine if the user utilized the mobile computing device 106 to create/update the user settings profile.

If it is determined that the user settings profile was created/updated on the mobile computing device 106 (at block 302), at block 304, the method includes determining if the ignition switch of the vehicle 102 is enabled and the mobile computing device 106 is directly connected to the vehicle 102. In one embodiment, as described above, the settings profile storage module 132 can utilize the communication device of the mobile computing device 106 to send the ping signal to the communication unit 120 in order determine if the vehicle ignition is in an accessory battery powered state or an engine ON state and that the mobile computing device 106 is in range to directly connect to the communication unit 120 of the vehicle 102.

If it is determined that the ignition switch is not enabled and the mobile computing device 106 is not directly connected to the vehicle 102 (at block 304), at block 306, the method includes identifying the user settings profile that is associated to the device ID of the mobile computing device 106 that is stored on the TCU 118. Specifically, the settings profile identification module 136 communicates with the settings profile storage module 132 to determine that the user settings profile that is associated to the device ID of the mobile computing device 106 is stored on the storage 126 of the TCU 118. As described in more detail below, the settings profile identification module 136 can identify the user settings profile on the TCU 118 to be further evaluated by the settings profile version control module 138 to determine if the user settings profile was created/updated since a last ignition cycle of the vehicle 102.

If it is determined that the ignition switch is enabled and the mobile computing device 106 is directly connected to the vehicle 102, at block 308, the method includes identifying the user settings profile that is associated to the device ID of the mobile computing device 106 and/or the smart entry device 108 that is stored on the head unit 112. In one embodiment, the settings profile identification module 136 communicates with the settings profile storage module 132 to determine that the user settings profile that was created/updated on the mobile computing device 106 and is associated to the device ID of the mobile computing device 106 and/or the smart entry device 108 is stored on the storage 122 of the head unit 112 (based on the settings profile storage module 132 storing the user settings profile on the head unit 112 directly from the mobile computing device at block 210 of FIG. 2).

Referring again to block 302, if it is determined that the user settings profile was not created/updated on the mobile computing device 106, at block 310, it is further determined if the user settings profile was created/updated on the head unit 112. In one embodiment, the settings profile identification module 136 can communicate with the settings profile storage module 132 to determine if the user utilized the head unit 112 or personal computing device to create/update the user settings profile, since it is already determined that the user did not utilize the mobile computing device 106 to create/update the user settings profile.

If it is determined that the user settings profile was created/updated on the head unit 112 (at block 310), at block 308, the method includes identifying the user settings profile that is associated to the device ID of the mobile computing device 106 and/or the smart entry device 108 that is stored on the head unit 112. In one embodiment, the settings profile identification module 136 communicates with the settings profile storage module 132 to determine that the user settings profile that was created/updated on the head unit 112 and is associated to the device ID of the mobile computing device 106 and/or the smart entry device 108 is stored on the storage 122 of the head unit 112 (based on the settings profile storage module 132 storing the user settings profile on the head unit 112 at block 218 of FIG. 2).

If it is determined that the user settings profile was not created/updated on the head unit 112 (at block 310), at block 312, the method includes identifying the user settings profile that is associated to the device ID of the mobile computing device 106 and/or the smart entry device 108 that is stored on the central user settings data repository 128. In one embodiment, the settings profile identification module 135 communicates with the settings profile storage module 132 to determine that the user settings profile was created on the personal computing device and is associated to the device ID of the mobile computing device 106 and/or the smart entry device 108 that is stored on the central user settings data repository 128.

Referring again to FIG. 1, in an exemplary embodiment, the settings profile identification module 136 prioritizes the user settings profile that is associated to the mobile computing device 106 over the user settings profile that is associated to the smart key device 108. Consequently, if both the mobile computing device 106 and the smart key device 108 are determined to be connected to the vehicle 102, the settings profile identification module 136 ensures the user settings profile that is associated to the device ID of the mobile computing device 106 is identified to be further evaluated by the settings profile version control module 138. Therefore, if the user settings profile that is associated to the mobile computing device 106 (that is connected to the vehicle 102) is different (is from another user) than the user settings profile that is associated to the smart key device 108 (that is connected to the vehicle 102), the user settings profile that is associated to the mobile computing device 106 will be utilized over the user settings profile that is associated with the smart key device 108.

As an illustrative example, 'User A' can create a user settings profile that is associated to the device ID of her mobile computing device 106, and 'User B' can create a user settings profile that is associated to the device ID of his smart key device 108. In a scenario when both 'User A' and 'User B' enter the vehicle 102, and their respective devices 106, 108 connect to the vehicle 102, the vehicle settings logic application 104 will identify the user settings profile associated to User A's mobile computing device 106 to be applied to adjust the programmable features of the vehicle system(s) 114 in accordance to User A's preferences.

In an exemplary embodiment, the settings profile version control module 138 of the vehicle settings logic application 104 is utilized to determine if the user settings profile that was created/updated by the user on the mobile computing device 106 and that is identified by the settings profile identification module 136 on the mobile device 106 or the TCU 118 has been created/updated (by the user) since the last ignition cycle of the vehicle 102. In some embodiments, when the user settings profile is created/updated by the user, in addition to associating the device ID of the mobile computing device 106 and/or smart key device 108 to the user settings profile, the settings profile storage module 132 also associates a version number to the user settings profile upon storing the user settings profile on the mobile computing device 106 and/or the TCU 118.

In an exemplary embodiment, as will be described in more detail below, when the user settings vehicle control module 138 determines that the user settings profile was created by the user on the mobile computing device 106, the user settings vehicle control module 138 determines if the identified user setting profile (that was created by the mobile computing device 106 and is stored on the mobile computing device 106 or the TCU 118) has been created/updated since a last ignition cycle of the vehicle 102. Upon determining that the user settings profile was created/updated since the last ignition cycle of the vehicle 102, the vehicle settings logic application 104 saves a copy of the user settings profile on the storage 122 of the head unit 112 to be applied each time the vehicle 102 is used until the user settings profile is updated. In one embodiment, upon applying the user settings profile that was saved to the head unit 112, the vehicle settings logic application 104 classifies the user settings profile stored on the head unit 112 as a 'pre-existing' user settings profile.

In some embodiments, upon the determination that the user created/updated the user settings profile on the mobile computing device 106, the settings profile version control module 138 also determines if the version of the pre-existing user settings profile stored on the head unit 112 matches the version (and the associated device ID) of the user settings profile that is identified by the settings profile identification module 136 (that is stored on the mobile computing device 106 or the TCU 118). In an exemplary embodiment, each time the vehicle ignition switch is enabled, the settings profile version control module 138 communicates with the settings profile storage module 132 in order to determine if the user created the user settings profile on the mobile computing device 106 or on the head unit 112 (e.g., via the display unit of the head unit 112). In one embodiment, when the settings profile version control module 138 determines that the user settings profile is created by the user on the mobile computing device 106, the settings profile version control module 138 can determine if the user settings profile was created/updated since the last ignition cycle of the vehicle 102. In one embodiment, the settings profile version control module 138 can determine that the user settings profile has been created/updated since the last ignition cycle of the vehicle 102 when it is determined that the pre-existing user settings profile (that was applied prior to the last ignition cycle of the vehicle 102) stored on the head unit 112 is an earlier version than (and is associated to the same device ID as) the user settings profile identified by the settings profile identification module 136. On the other hand, the settings profile version control module 138 can determine that the user settings profile has been created/updated prior to the last ignition cycle of the vehicle 102 when it is determined that the pre-existing user settings profile (that was applied prior to the last ignition cycle of the vehicle 102) stored on the head unit 112 matches the version of (and is associated to the same device ID as) the user settings profile identified by the settings profile identification module 136.

In an additional embodiment, when the user settings profile is created/updated by the user on the mobile computing device 106, in addition to associating the device ID to the user settings profile, the settings profile storage module 132 also associates a time stamp indicator that signifies when the user settings profile was created/updated by the user. In one embodiment, the ECU 116 can include a log that logs the time of each ignition cycle (each specific time the vehicle 102 was enabled), the settings profile version control module 138 can communicate with the ECU 116 to determine the time of the last ignition cycle. Upon determining the time of the last ignition cycle, the settings profile version control module 138 can analyze the time stamp associated with the user settings profile identified by the settings profile identification module 136 (as being stored on the mobile computing device 106 or the TCU 118) in order to determine if the user settings profile was updated since the last ignition cycle of the vehicle 102.

In an exemplary embodiment, the settings profile version control module 138 communicates with a vehicle control module 140 of the vehicle settings logic application 104 to apply the created/updated user settings profile from the mobile computing device 106, the TCU 118, the head unit 112, the central user settings data repository 128 or the pre-existing user settings profile from the head unit 112 based on the determination by the settings profile version control module 138 that the user settings profile was created/updated on the head unit 112, or the personal computing device or if the user settings profile that was created on the mobile computing device 112 has been updated since the last ignition cycle of the vehicle 102.

Figure 4:
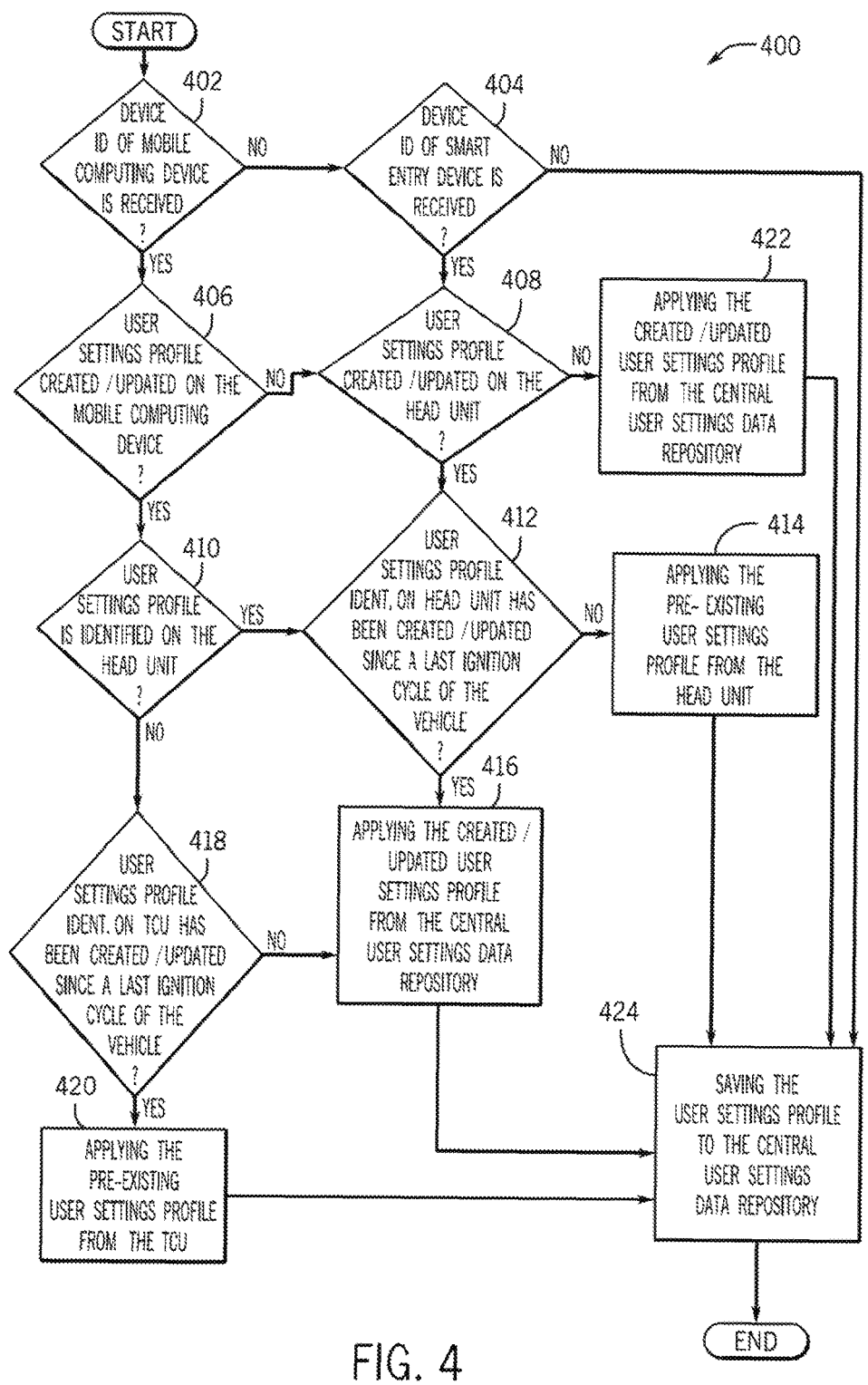
FIG. 4 is a process flow diagram of a method for applying a user settings profile stored on at one or more components of the system, according to an exemplary embodiment of the present disclosure.

Referring now to FIG. 4, a process flow diagram of a method 400 for applying a user settings profile stored on at one or more components of the system 100 is shown. FIG. 4 will be described with reference to the components of FIG. 1, though it is to be appreciated that the method of FIG. 4 can be used with other systems/components. In an exemplary embodiment, the method 400 is executed by the vehicle control module 140 of the vehicle settings logic application 104 each time an ignition cycle of the vehicle 102 occurs (e.g., when the driver of the vehicle 102 turns the vehicle 102 to an accessory battery powered or engine ON state).

At block 402, the method includes determining if the device ID of the mobile computing device 106 is received. In one embodiment, the settings profile identification module 136 communicates with the device identification module 134 to determine if the device identification module 134 received a device ID from the user's mobile computing device 110. As described above, when the vehicle ignition is enabled, the device identification module 134 receives the device ID of the connected mobile computing device 106 and/or smart key device 108. Specifically, upon connecting to the communication unit 120 of the vehicle 102, the mobile computing device 106 sends the corresponding device ID to the communication unit 120 in order for the device identification module 132 to identify the connected mobile computing device 106. In other words (at block 402), the settings profile identification module 136 determines if the mobile computing device 106 is directly connected to the communication unit 120 of the vehicle 102.

If it is determined that the device ID of the mobile computing device 106 is not received (at block 402), at block 404, it is determined if the device ID of the smart entry device 108 is received. Specifically, upon receiving the determination by the settings identification module 128 that the device ID of the mobile computing device 106 was not received (i.e., the mobile computing device 106 was not connected to the vehicle 102), the settings profile identification module 136 communicates with the device identification module 134 to determine if the device ID of the smart key device 108 (that is directly connected to the communication unit 120 of the vehicle 102) is received by the settings identification module 126.

If it is determined that the device ID of the smart entry device 108 is received (at block 404), at block 408, the method includes determining if the user settings profile was created on the head unit 112. In one embodiment, the settings profile identification module 136 can communicate with the settings profile storage module 132 to determine if the user utilized the head unit 112 or personal computing device to create/update the user settings profile, since it is already determined that the user did not utilize the mobile computing device 106 to create/update the user settings profile.

If it is determined that the user settings profile was created/updated on the head unit 122 (at block 408), at block 412, the method includes determining if the user settings profile identified on the head unit has been created/updated since a last ignition cycle of the vehicle 102. In one embodiment, if the settings profile version control module 138 determines that the pre-existing user settings profile is stored on the head unit 112, the settings profile version control module 138 further evaluates the version of the pre-existing user settings profile stored on the head unit 112 to determine if it is a matching version or an earlier version than the identified user settings profile 106 stored on the central user settings data repository 128. For example, it can be determined if the user used the mobile computing device 106 or personal computing device to update the user settings profile that was stored on the central user settings data repository at a point of time after the use settings profile was stored on the head unit 112.

If it is determined that the user settings profile identified on the head unit 112 has been not created/updated since a last ignition cycle of the vehicle 102 (at block 412), at block 414, the method includes applying the pre-existing user settings profile from the head unit 112. Specifically, if the settings profile identification module 136 determines that the version of the user settings profile stored on the head unit 112 is a matching version of the user settings profile that is identified by the settings profile identification module 136 as stored on the central user settings data repository 128, then the settings profile identification module 136 sends a corresponding command to the vehicle control module 140 to apply created/updated user settings profile stored on the head unit 112. Therefore, the created/updated user settings profile associated to the device ID of the smart entry device 108 that is stored on the head unit 112 is applied by the vehicle control module 140 in order to adjust the programmable features of the vehicle system(s) 114. Specifically, the vehicle control module 140 can send a command to the ECU 116 to control the vehicle system(s) 114 based on the user settings profile associated to the device ID of the user's smart key device 108 that is identified by the device identification module 134 (e.g., when the user entered the vehicle 102). In an alternate embodiment, the vehicle control module 140 can access the external server infrastructure 110 via a connection from the mobile computing device 106 or the TCU 118 in order to apply the user settings profile stored on the central user settings data repository 128.

The method proceeds to block 424, wherein the method includes saving the user settings profile to the central user settings data repository 128. In one embodiment, the wireless connection (e.g., Wi-Fi, 4G, LTE, etc.) can be established from the communication device of the mobile computing device 106 to the external computing infrastructure 110 when the mobile computing device 106 is connected to the vehicle 102 in order to store the user settings profile that was applied from the head unit 112 on the central user settings data repository 128. In another embodiment, the vehicle control module 140 can utilize the telematics communication device 124 of the TCU 118 to send a copy of the created/updated user settings profile that was applied from the head unit 112 to the central user settings data repository 128 of the external server infrastructure 110 (e.g., via Wi-Fi, 4G, LTE, etc.) Therefore, the external server infrastructure 100 stores the most recently applied copy of the user settings profile associated to the device ID of the smart key device 108 (received by the device identification module 134).

Referring back to block 412, if it is determined that the user settings profile identified on the head unit has been created/updated since a last ignition cycle of the vehicle 102, at block 416, the method includes applying the created/updated user settings profile from the central user settings data repository 128. Specifically, the communications device of the mobile computing device 106 or the telematics communication device 124 of the TCU 118 can be utilized to wirelessly connect (e.g., Wi-Fi, 4G, LTE, etc.) to the external server infrastructure 110 on the cloud to transfer the user settings profile to the communication unit 120 of the vehicle 102 to be executed by the ECU 116 to control the one or more vehicle systems 114.

Referring back to block 408, if it is determined that the user settings profile was not created/updated on the head unit 122, at block 422, the method includes applying the created/updated user settings profile from the central user settings data repository 128. In one embodiment, the vehicle control module 140 can apply the updated version of the created/updated user settings profile that was saved on the central user settings data repository 128 when the user created/updated his/her user settings profile. Specifically, the communications device of the mobile computing device 106 or the telematics communication device 124 of the TCU 118 can be utilized to wirelessly connect (e.g., Wi-Fi, 4G, LTE, etc.) to the external server infrastructure 110 on the cloud to transfer the user settings profile to the communication unit 120 of the vehicle 102 to be executed by the ECU 116 to control the one or more vehicle systems 114.

At block 424, the method includes saving the user settings profile to the central user settings data repository 128. In one embodiment, upon applying the user settings profile directly from the central user settings data repository 128, the vehicle control module 140 can also utilize the communication device of the mobile computing device 106 or the telematics communication device 124 of the TCU 118 to resave a copy of the updated/created user settings profile that is applied from the central user settings data repository 128 back to the central user settings data repository 128 of the external server infrastructure 110 on the cloud. The resaving of the user settings profile can ensure that the version of the user settings profile stored on the central user settings data repository 128 includes an updated time stamp based on the time of its application. In some embodiments, the vehicle control module 140 can further save the user settings profile as a pre-existing user settings profile on the storage 122 of the head unit 112.

Referring again to block 402, if the method determines that the device ID of the mobile computing device 106 is received, at block 406, the method includes determining if the user settings profile was created/updated on the mobile computing device 106. In one embodiment, settings profile version control module 140 communicates with the settings profile storage module 132 in order to determine if the user created the user settings profile on the mobile computing device 106.

If it is determined that the user settings profile was not created/updated on the mobile computing device 106 (at block 406), the method once again returns to block 408, wherein the method includes determining if the user settings profile was created on the head unit 112. Specifically, the settings profile identification module 136 can communicate with the settings profile storage module 132 to determine if the user utilized the head unit 112 or personal computing device to create/update the user settings profile that is associated to the device ID of the mobile computing device 106.

If it is determined that the user settings profile was created/updated on the head unit 112 (at block 408), at block 412 the method includes determining if the user settings profile identified on the head unit has been created/updated since a last ignition cycle of the vehicle 102. In one embodiment, if the settings profile version control module 138 determines that the pre-existing user settings profile is stored on the head unit 112, the settings profile version control module 138 further evaluates the version of the pre-existing user settings profile stored on the head unit 112 to determine if it is a matching version or an earlier version than the identified user settings profile 106 stored on the central user settings data repository 128.

If it is determined that the user settings profile identified on the head unit 112 has been not created/updated since a last ignition cycle of the vehicle 102 (at block 412), at block 414, the method includes applying the pre-existing user settings profile from the head unit 112. In one embodiment, when the device identification module 134 determines that device ID of the mobile computing device 106 is received, the settings profile storage module 132 communicates to the vehicle control module 140 that the user settings profile associated with the device ID of the mobile computing device 106 is stored on the head unit 112, since the user created/update his/her user settings profile on the head unit 112 (e.g., the display unit of the head unit 112). Additionally, it is determined that the user associated his/her user settings profile to the device ID of the mobile computing device 106. Therefore, the created/updated user settings profile associated to the device ID of the mobile computing device 106 that is stored on the head unit 112 is applied by the vehicle control module 140 in order to adjust the programmable features of the vehicle system(s) 114. Specifically, the vehicle control module 140 can send a command to the ECU 116 to control the vehicle system(s) 114 based on the user settings profile associated to the device ID of the user's mobile computing device 106 that is identified by the device identification module 134 (e.g., when the user entered the vehicle 102).

The method proceeds to block 424, wherein the method includes saving the user settings profile to the central user settings data repository 128. In one embodiment, the wireless connection (e.g., Wi-Fi, 4G, LTE, etc.) can be established from the communication device of the mobile computing device 106 to the external computing infrastructure 110 when the mobile computing device 106 is connected to the vehicle 102 in order to store the user settings profile that was applied from the head unit 112 on the central user settings data repository 128. In another embodiment, the vehicle control module 140 can utilize the telematics communication device 124 of the TCU 118 to send a copy of the created/updated user settings profile that was applied from the head unit 112 to the central user settings data repository 128 of the external server infrastructure 110 (e.g., via Wi-Fi, 4G, LTE, etc.) Therefore, the external server infrastructure 100 stores the most recently applied copy of the user settings profile associated to the device ID of the mobile computing device 106.

Referring back to block 412, if it is determined that the user settings profile identified on the head unit has been created/updated since a last ignition cycle of the vehicle 102, at block 416, the method includes applying the created/updated user settings profile from the central user settings data repository 128. Specifically, the communications device of the mobile computing device 106 or the telematics communication device 124 of the TCU 118 can be utilized to wirelessly connect (e.g., Wi-Fi, 4G, LTE, etc.) to the external server infrastructure 110 on the cloud to transfer the user settings profile to the communication unit 120 of the vehicle 102 to be executed by the ECU 116 to control the one or more vehicle systems 114. In some embodiments, the vehicle control module 140 can further save the user settings profile as a pre-existing user settings profile on the storage 122 of the head unit 112.

Referring back to block 408, if it is determined that the user settings profile was not created/updated on the head unit 122, at block 422, the method includes applying the created/updated user settings profile from the central user settings data repository 128. In one embodiment, the vehicle control module 140 can apply the updated version of the created/updated user settings profile that is associated to the device ID of the mobile computing device 106 and that was saved on the central user settings data repository 128 when the user created/updated his/her user settings profile. Specifically, the communications device of the mobile computing device 106 or the telematics communication device 124 of the TCU 118 can be utilized to wirelessly connect (e.g., Wi-Fi, 4G, LTE, etc.) to the external server infrastructure 110 on the cloud to transfer the user settings profile to the communication unit 120 of the vehicle 102 to be executed by the ECU 116 to control the one or more vehicle systems 114. In some embodiments, the vehicle control module 140 can further save the user settings profile as a pre-existing user settings profile on storage 122 of the head unit 112.

Referring again to block 406, if it is determined that the user settings profile was created/updated on the mobile computing device 106, at block 410, the method includes determining if the user settings profile is identified on the head unit 112. In one embodiment, the settings profile version control module 138 communicates with the settings profile identification module 136 in order to determine if the user settings profile associated with the device ID of the user's mobile computing device 106 is identified on the head unit 112.

If it is determined that the user settings profile is identified on the head unit 112 (at block 410), at block 412, the method includes determining if the user settings profile identified on the head unit 112 has been created/updated since a last ignition cycle of the vehicle 102. In one embodiment, if the settings profile version control module 138 determines that the pre-existing user settings profile is stored on the head unit 112, the settings profile version control module 138 further evaluates the version of the pre-existing user settings profile stored on the head unit 112 to determine if it is a matching version or an earlier version than the identified user settings profile 106 stored on the central user settings data repository 128.

If it is determined that the user settings profile identified on the mobile computing device has not been created/updated since a last ignition cycle of the vehicle 102 (at block 412), at block 414, the method includes applying the pre-existing user settings profile from the head unit 112. Specifically, if the settings profile identification module 136 determines that the version of the pre-existing user settings profile (that was applied by the vehicle control unit 140 prior to the last ignition cycle of the vehicle 102) stored on the central user settings data repository 128 matches the version of the user settings profile that is identified by the settings profile identification module 136 as stored on the head unit 112, then the settings profile identification module 136 sends a corresponding command to the vehicle control module 140 to apply the pre-existing user settings profile stored on the head unit 112. The vehicle control module 140 applies the pre-existing user settings profile (that corresponds to the device ID of the device 106 recognized by the device identification module 134) from the head unit 112 of the vehicle 102.

The method proceeds to block 424, wherein the method includes saving the user settings profile to the central user settings data repository 128. In one embodiment, the wireless connection (e.g., Wi-Fi, 4G, LTE, etc.) can be established from the communication device of the mobile computing device 106 to the external computing infrastructure 110 when the mobile computing device 106 is connected to the vehicle 102 in order to store the user settings profile that was applied from the head unit 112 on the central user settings data repository 128. In another embodiment, the vehicle control module 140 can utilize the telematics communication device 124 of the TCU 118 to send a copy of the created/updated user settings profile that was applied from the head unit 112 to the central user settings data repository 128 of the external server infrastructure 110 (e.g., via Wi-Fi, 4G, LTE, etc.) Therefore, the external server infrastructure 100 stores the most recently applied copy of the user settings profile associated to the device ID of the smart key device 108 (received by the device identification module 134).

Referring again to block 412, if it is determined that the user settings profile identified on the head unit 112 has been created/updated since a last ignition cycle of the vehicle 102, at block 416, the method includes applying the created/updated user settings profile from the central user settings data repository 128. In one embodiment, the settings profile identification module 136 determines that the version of the pre-existing user settings profile stored on the head unit 112 is an earlier version of the identified user settings profile stored on the central user settings data repository 128, then the settings profile identification module 136 sends a corresponding command to the vehicle control module 140 to apply the updated user settings profile stored on the central user settings data repository 128.

The method proceeds to block 424, wherein the method includes saving the user settings profile to the central user settings data repository 128. In one embodiment, upon applying the user settings profile directly from the central user settings data repository 128, the vehicle control module 140 can also utilize the communication device of the mobile computing device 106 or the telematics communication device 124 of the TCU 118 to resave a copy of the updated/created user settings profile that is applied from the central user settings data repository 128 back to the central user settings data repository 128 of the external server infrastructure 110 on the cloud. The resaving of the user settings profile can ensure that the version of the user settings profile stored on the central user settings data repository 128 includes an updated time stamp based on the time of its application.

Referring again to block 410, if it is determined that the user settings profile is not identified on the head unit 112, at block 418, the method includes determining if the user settings profile is identified on the TCU 118 has been created/updated since a last ignition cycle of the vehicle 102. In one embodiment, if the settings profile version control module 138 determines that the pre-existing user settings profile is stored on the TCU 118, the settings profile version control module 138 further evaluates the version of the pre-existing user settings profile stored on the TCU 118 to determine if it is a matching version or an earlier version than the identified user settings profile 106 stored on the central user settings data repository 128. In some embodiments, the vehicle control module 140 can further save the user settings profile as a pre-existing user settings profile on the storage 122 of the head unit 112.

If it is determined that the user settings profile identified on the TCU 118 has been created/updated since a last ignition cycle of the vehicle 102 (at block 418), at block 416, the method applies the created/updated user settings profile from the central user settings data repository 128. Specifically, if the settings profile identification module 136 determines that the version of the pre-existing user settings profile (that was applied by the vehicle control unit 140 prior to the last ignition cycle of the vehicle 102) stored on the central user settings data repository 128 does not match the version of the user settings profile that is identified by the settings profile identification module 136 as stored on the TCU 118, then the settings profile identification module 136 sends a corresponding command to the vehicle control module 140 to apply the pre-existing user settings profile stored on the central user settings data repository 128. The vehicle control module 140 applies the pre-existing user settings profile (that corresponds to the device ID of the device 106 recognized by the device identification module 134) from the central user settings data repository 128.

The method proceeds to block 424, wherein the method includes saving the user settings profile to the central user settings data repository 128. In one embodiment, upon applying the user settings profile directly from the central user settings data repository 128, the vehicle control module 140 can also utilize the communication device of the mobile computing device 106 or the telematics communication device 124 of the TCU 118 to resave a copy of the updated/created user settings profile that is applied from the central user settings data repository 128 back to the central user settings data repository 128 of the external server infrastructure 110 on the cloud. The resaving of the user settings profile can ensure that the version of the user settings profile stored on the central user settings data repository 128 includes an updated time stamp based on the time of its application. In some embodiments, the vehicle control module 140 can further save the user settings profile as a pre-existing user settings profile on the storage 122 of the head unit 112.

Referring back to block 418, if it is determined that the user settings profile identified on the TCU 118 has been not created/updated since a last ignition cycle of the vehicle 102, at block 420, the method includes applying the pre-existing user settings profile from the TCU 118. Specifically, if the settings profile identification module 136 determines that the pre-existing user settings profile is not stored on the head unit 112 or that the version of the pre-existing user settings profile (that was applied by the vehicle control unit 140 prior to the last ignition cycle of the vehicle 102) stored on the TCU 118 is a matching version of the user settings profile that is identified by the settings profile identification module 136 as stored on the central user settings data repository 128, then the settings profile identification module 136 sends a corresponding command to the vehicle control module 140 to apply created/updated user settings profile stored on the storage 124 of the TCU 118.

The method proceeds to block 424, wherein the method includes saving the user settings profile to the central user settings data repository 128. In one embodiment, the wireless connection (e.g., Wi-Fi, 4G, LTE, etc.) can be established from the communication device of the mobile computing device 106 to the external computing infrastructure 110 when the mobile computing device 106 is connected to the vehicle 102 in order to store the user settings profile that was applied from the head unit 112 on the central user settings data repository 128. In another embodiment, the vehicle control module 140 can utilize the telematics communication device 124 of the TCU 118 to send a copy of the created/updated user settings profile that was applied from the head unit 112 to the central user settings data repository 128 of the external server infrastructure 110 (e.g., via Wi-Fi, 4G, LTE, etc.) Therefore, the external server infrastructure 100 stores the most recently applied copy of the user settings profile associated to the device ID of the smart key device 108 (received by the device identification module 134). In some embodiments, the vehicle control module 140 can further save the user settings profile as a pre-existing user settings profile on the storage 122 of the head unit 112.

Figure 5:
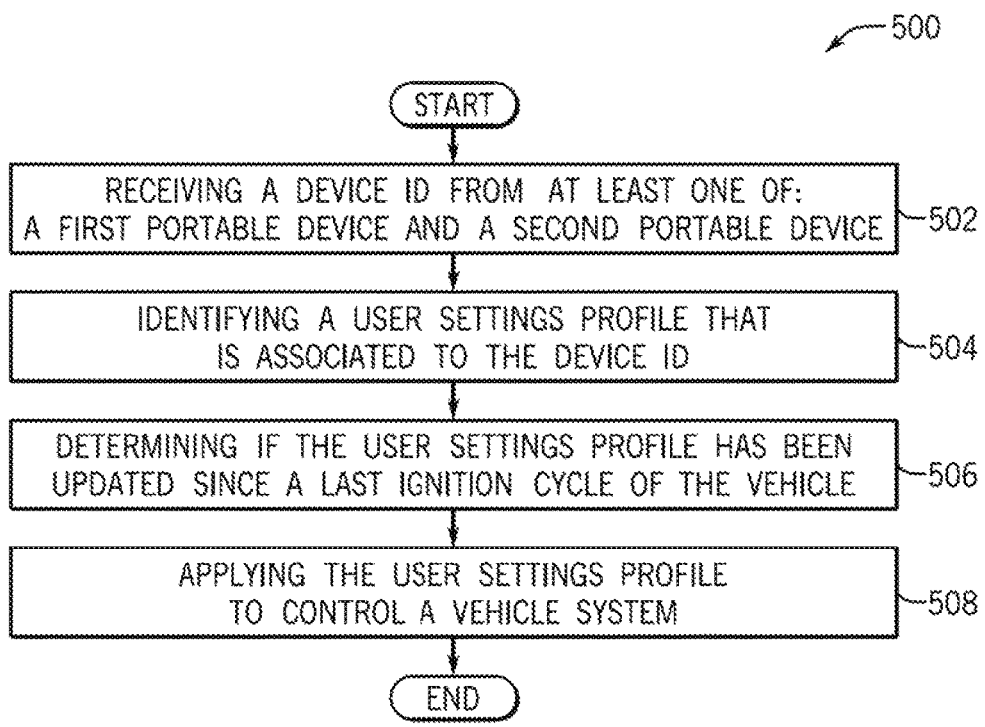
FIG. 5 is a process flow diagram of a method for applying vehicle settings to the vehicle, according to an exemplary embodiment of the present disclosure.

Referring now to FIG. 5, a process flow diagram of a method 500 for applying vehicle settings to the vehicle 102 is shown. In an exemplary embodiment, the method 500 is executed by the modules 134-140 of the vehicle settings logic application 104. At block 502, the method includes receiving a device ID from at least one of the first portable device and a second portable device. As described above, in one embodiment, the device identification device can receive the device ID from the mobile computing device 106 and/or the smart key device 108 upon a direct connection of the mobile computing device 106 and/or the smart key device 108 to the communication unit 120 of the vehicle 102.

At block 504, the method includes identifying a user settings profile that is associated to the device ID. In one embodiment, as described above (in the method 300 of FIG. 3), the settings profile identification module 136 can identify the user settings profile associated to the mobile computing device 106 and/or the smart key device 108 (received at block 502) as being stored on the mobile computing device 106, the TCU 118, and/or the head unit 112. At block 506, the method includes determining if the user settings profile has been updated since a last ignition cycle of the vehicle 102. In one embodiment, the settings profile version control module 138 determines if the user settings profile associated to the mobile computing device 106 that is identified on the mobile computing device 106 or the TCU 118 has been created/updated by the user since the last ignition cycle of the vehicle 102.

At block 508, the method includes applying the user settings profile to control a vehicle system. In an exemplary embodiment, as described above (in the method 400 of FIG. 4), the vehicle control module 140 applies the user settings profile from the head unit 112, the central user settings repository 128, or the TCU 118.

As discussed, various embodiments of the vehicle settings decision logic system 100 can be utilized. In addition, numerous components and technologies that have not been discussed herein can be utilized to compute operations associated with the vehicle settings logic application 104 and to adjust the programmable functions of the vehicle system(s) 114 per the user's preferences. It is to be appreciated that in addition of one or more mobile computing device 106 and/or smart key devices 108, the vehicle settings logic application 104 can be utilized on and/or with different types of devices that are in production and that are not yet in production.

The embodiments discussed herein can also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media can include volatile and nonvolatile, removable and non-removable media implemented in any method or technology for storage of information such as computer readable instructions, data structures, modules or other data. Computer readable storage media excludes non-transitory tangible media and propagated data signals.

It will be appreciated that various implementations of the above-disclosed and other features and functions, or alternatives or varieties thereof, can be desirably combined into many other different systems or applications. Also that various presently unforeseen or unanticipated alternatives, modifications, variations, or improvements therein can be subsequently made by those skilled in the art which are also intended to be encompassed by the following claims.

The invention claimed is:

1. A computer-implemented method for applying vehicle settings to a vehicle comprising:

storing at least one user settings profile on at least one of a plurality of components associated with the vehicle based on a computing device that is used to create or update the at least one user settings profile, wherein the at least one of the plurality of components include a head unit of the vehicle and a telematics control unit of the vehicle, wherein the at least one user settings profile includes at least one of: a user settings profile that has been updated since a last ignition cycle of the vehicle and a user settings profile that has been created or updated prior to the last ignition cycle of the vehicle;

determining if the at least one user settings profile stored on the at least one of the plurality of components has been updated since the last ignition cycle of the vehicle, wherein determining if the at least one user settings profile has been updated since the last ignition cycle of the vehicle includes evaluating the at least one user settings profile stored on the at least one of the plurality of components to determine if it matches a version of at least one user settings profile that is stored on a central user settings data repository;

executing the at least one user settings profile from the head unit, the telematics control unit, or the central user settings data repository based on if the at least one user settings profile has been updated since the last ignition cycle of the vehicle and on a connection of at least: a first portable device and a second portable device to the vehicle; and controlling at least one vehicle system of the vehicle, wherein the at least one vehicle system is controlled based on the execution of the at least one user settings profile.

2. The computer-implemented method of claim 1, wherein storing the at least one user settings profile includes determining that the at least one user settings profile is created or updated on the first portable device, wherein the at least one user settings profile is associated to a device identification of the first portable device, wherein the first portable device includes a mobile phone.

3. The computer-implemented method of claim 2, wherein storing the at least one user settings profile includes determining if an ignition switch of the vehicle is enabled and the first portable device is connected to the vehicle and storing the at least one user settings profile on the head unit and the central user settings data repository, wherein the at least one user settings profile is stored on the telematics control unit and the central user settings data repository when it is determined that the ignition switch of the vehicle is disabled and the first portable device is not connected to the vehicle.

4. The computer-implemented method of claim 2, wherein storing the at least one user settings profile includes determining that the at least one user settings profile is created on the head unit, wherein the at least one user settings profile is associated to at least one of: the device identification of the first portable device and a device identification of the second portable device, wherein the second portable device includes a smart entry device, wherein the at least one user settings profile is stored on the head unit and the central user settings data repository.

5. The computer-implemented method of claim 1, wherein determining if the at least one user settings profile has been updated since the last ignition cycle of the vehicle includes comparing the version of the at least one user settings profile stored on the central user settings data repository with a version of the at least one user settings profile stored on the head unit and determining if the at least one user settings profile is at least one of: an updated user settings profile that is stored on the central user settings data repository that has been created or updated since the last ignition cycle of the vehicle, and a pre-existing user settings profile that is stored on the head unit that has been created or updated since the last ignition cycle of the vehicle.

6. The computer-implemented method of claim 5, wherein executing the at least one user settings profile includes determining that the first portable device is connected to the vehicle based on receiving a device identification associated with the first portable device, wherein the updated user settings profile associated with the device identification of the first portable device that is stored on the central user settings repository is executed when it is determined that the pre-existing user settings profile has been created or updated since it was stored on the head unit, otherwise the pre-existing user settings profile associated with the device identification of the first portable device that is stored on the head unit is executed.

7. The computer-implemented method of claim 1, wherein determining if the at least one user settings profile has been updated since the last ignition cycle of the vehicle includes comparing a version of the at least one user settings profile stored on the telematics control unit with the version of the at least one user settings profile stored on the central user settings data repository and determining if the at least one user settings profile is at least one of: an updated user settings profile that is stored on the central user settings data repository that has been created or updated since the last ignition cycle of the vehicle, and a pre-existing user settings profile that has been created or updated since the last ignition cycle of the vehicle.

8. The computer-implemented method of claim 7, wherein executing the at least one user settings profile includes determining that the first portable device is connected to the vehicle based on receiving the device identification associated with the first portable device, wherein the updated user settings profile associated with the device identification of the first portable device that is stored on the central user settings repository is executed when it is determined that the pre-existing user settings profile has been created or updated since it was stored on the telematics control unit, otherwise the pre-existing user settings profile associated with the device identification of the first portable device that is stored on the telematics control unit is executed.

9. The computer-implemented method of claim 1, wherein executing the at least one user settings profile includes determining that the second portable device is connected to the vehicle based on receiving a device identification associated with the second portable device and determining that the first portable device is not connected to the vehicle, wherein the at least one user settings profile that is executed includes at least one of: an updated user settings profile associated with the device identification of the second portable device that is stored on the central user settings data repository and a pre-existing user settings profile associated with the device identification of the second portable device that is stored on the head unit, wherein the updated user settings profile is executed that is associated with the device identification of the second portable device when it is determined that the pre-existing user settings profile has been created or updated since it was stored on the head unit, otherwise the pre-existing user settings profile associated with the device identification of the second portable device is executed.

10. A system for applying vehicle settings to a vehicle comprising:

a memory storing instructions when executed by a processor cause the processor to:

store at least one user settings profile on at least one of a plurality of components associated with the vehicle based on a computing device that is used to create or update the at least one user settings profile, wherein the at least one of the plurality of components include a head unit of the vehicle and a telematics control unit of the vehicle, wherein the at least one user settings profile includes at least one of: a user settings profile that has been updated since a last ignition cycle of the vehicle and a user settings profile that has been created or updated prior to the last ignition cycle of the vehicle;

determine if the at least one user settings profile stored on the at least one of the plurality of components has been updated since the last ignition cycle of the vehicle, wherein determining if the at least one user settings profile has been updated since the last ignition cycle of the vehicle includes evaluating the at least one user settings profile stored on the at least one of the plurality of components to determine if it matches a version of at least one user settings profile that is stored on a central user settings data repository;

execute the at least one user settings profile from the head unit, the telematics control unit, or the central user settings data repository based on if the at least one user settings profile has been updated since the last ignition cycle of the vehicle and on a connection of at least: a first portable device and a second portable device to the vehicle; and control the at least one vehicle system of the vehicle, wherein the at least one vehicle system is controlled based on the execution of the at least one user settings profile.

11. The system of claim 10, wherein storing the at least one user settings profile includes determining that the at least one user settings profile is created or updated on the first portable device, wherein the at least one user settings profile is associated to a device identification of the first portable device, wherein the first portable device includes a mobile phone.

12. The system of claim 11, wherein storing the at least one user settings profile includes determining if an ignition switch of the vehicle is enabled and the first portable device is connected to the vehicle and storing the at least one user settings profile on the head unit and the central user settings data repository, wherein the at least one user settings profile is stored on the telematics control unit and the central user settings data repository when it is determined that the ignition switch of the vehicle is disabled and the first portable device is not connected to the vehicle.

13. The system of claim 11, wherein storing the at least one user settings profile includes determining that the at least one user settings profile is created on the head unit, wherein the at least one user settings profile is associated to at least one of: the device identification of the first portable device and a device identification of the second portable device, wherein the second portable device includes a smart entry device, wherein the at least one user settings profile is stored on the head unit and the central user settings data repository.

14. The system of claim 10, wherein determining if the at least one user settings profile has been updated since the last ignition cycle of the vehicle includes comparing the version of the at least one user settings profile stored on the central user settings data repository with a version of the at least one user settings profile stored on the head unit and determining if the at least one user settings profile is at least one of: an updated user settings profile that is stored on the central user settings data repository that has been created or updated since the last ignition cycle of the vehicle, and a pre-existing user settings profile that is stored on the head unit that has been created or updated since the last ignition cycle of the vehicle.

15. The system of claim 14, wherein executing the at least one user settings profile includes determining that the first portable device is connected to the vehicle based on receiving a device identification associated with the first portable device, wherein the updated user settings profile associated with the device identification of the first portable device that is stored on the central user settings repository is executed when it is determined that the pre-existing user settings profile has been created or updated since it was stored on the head unit, otherwise the pre-existing user settings profile associated with the device identification of the first portable device that is stored on the head unit is executed.

16. The system of claim 10, wherein determining if the at least one user settings profile has been updated since the last ignition cycle of the vehicle includes comparing a version of the at least one user settings profile stored on the telematics control unit with the version of the at least one user settings profile stored on the central user settings data repository and determining if the at least one user settings profile is at least one of: an updated user settings profile that is stored on the central user settings data repository that has been created or updated since the last ignition cycle of the vehicle, and a pre-existing user settings profile that has been created or updated since the last ignition cycle of the vehicle.

17. The system of claim 16, wherein executing the at least one user settings profile includes determining that the first portable device is connected to the vehicle based on receiving the device identification associated with the first portable device, wherein the updated user settings profile associated with the device identification of the first portable device that is stored on the central user settings repository is executed when it is determined that the pre-existing user settings profile has been created or updated since it was stored on the telematics control unit, otherwise the pre-existing user settings profile associated with the device identification of the first portable device that is stored on the telematics control unit is executed.

18. The system of claim 10, wherein executing the at least one user settings profile includes determining that the second portable device is connected to the vehicle based on receiving a device identification associated with the second portable device and determining that the first portable device is not connected to the vehicle, wherein the at least one user settings profile that is executed includes at least one of: an updated user settings profile associated with the device identification of the second portable device that is stored on the central user settings data repository and a pre-existing user settings profile associated with the device identification of the second portable device that is stored on the head unit, wherein the updated user settings profile is executed that is associated with the device identification of the second portable device when it is determined that the pre-existing user settings profile has been created or updated since it was stored on the head unit, otherwise the pre-existing user settings profile associated with the device identification of the second portable device is executed.

19. A non-transitory computer readable storage medium storing instructions that, when executed by a computer, which includes at least a processor, causes the computer to perform a method, the method comprising:

storing at least one user settings profile on at least one of a plurality of components associated with a vehicle based on a computing device that is used to create or update the at least one user settings profile, wherein the at least one of the plurality of components include a head unit of the vehicle and a telematics control unit of the vehicle, wherein the at least one user settings profile includes at least one of: a user settings profile that has been updated since a last ignition cycle of the vehicle and a user settings profile that has been created or updated prior to the last ignition cycle of the vehicle;

determining if the at least one user settings profile stored on the at least one of the plurality of components has been updated since the last ignition cycle of the vehicle, wherein determining if the at least one user settings profile has been updated since the last ignition cycle of the vehicle includes evaluating the at least one user settings profile stored on the at least one of the plurality of components to determine if it matches a version of at least one user settings profile that is stored on a central user settings data repository;

executing the at least one user settings profile from the head unit, the telematics control unit, or the central user settings data repository based on if the at least one user settings profile has been updated since the last ignition cycle of the vehicle and on a connection of at least: a first portable device and a second portable device to the vehicle; and controlling the at least one vehicle system of the vehicle, wherein the at least one vehicle system is controlled based on the execution of the at least one user settings profile.

20. The non-transitory computer readable storage medium of claim 19, wherein executing the at least one user settings profile to control the at least one vehicle system includes determining that the first portable device is connected to the vehicle based on receiving a device identification associated with the first portable device, wherein an updated user settings profile associated with the device identification of the first portable device that is stored on the central user settings repository is executed when it is determined that a pre-existing user settings profile has been created or updated since it was stored on the head unit or the telematics control unit, otherwise the pre-existing user settings profile associated with the device identification of the first portable device that is stored on at least one of: the head unit and the telematics control unit is executed.

* * * * *